Feb. 18, 1958 G. N. HEIN, JR 2,823,677
LANCET
Filed Jan. 17, 1955
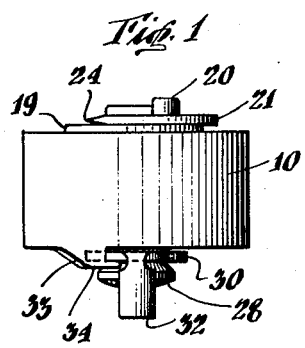
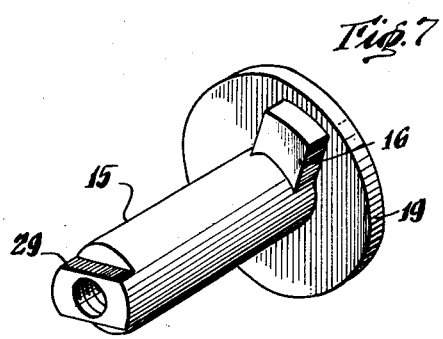
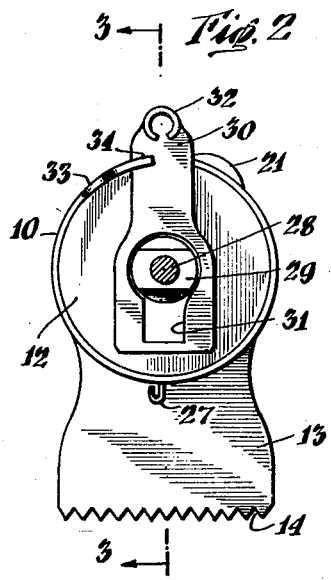
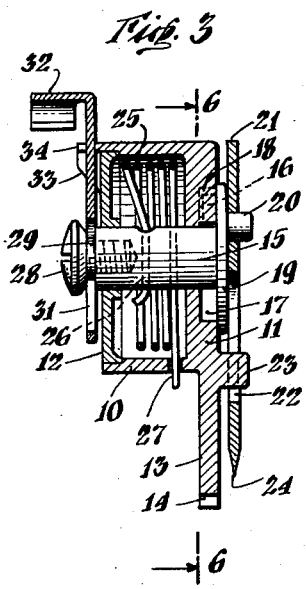
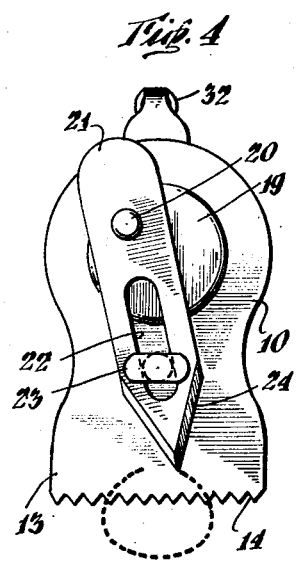
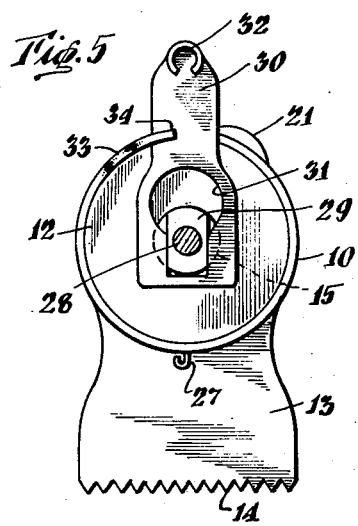
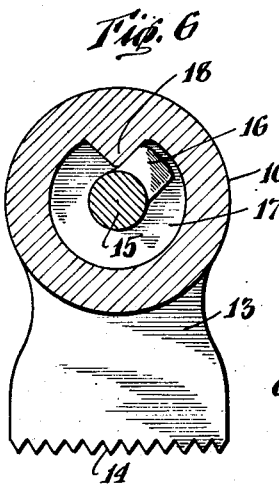
INVENTOR
George N. Hein, Jr.
BY
Kane, Dalsimer and Kane
ATTORNEYS

United States Patent Office 2,823,677
Patented Feb. 18, 1958

2,823,677

LANCET

George N. Hein, Jr., San Carlos, Calif., assignor to Becton, Dickinson and Company, Rutherford, N. J., a corporation of New Jersey Application January 17, 1955, Serial No. 482,155

6 Claims. (Cl. 128—314)

This invention relates to a structurally and functionally improved lancet and especially a lancet which is capable of self-use.

So employed, the user will not be subjected to the natural mental resistance to slashing his own flesh and where such action is immediately necessary, due to the fact that a snake or venomous insect has bitten him. The lancet, therefore, acts as an incisor in that it will freely induce bleeding and the escape of venom which has been injected into and below the epidermis layers.

Moreover, in using an apparatus of the present type, practically no pain will be experienced. Therefore, there will be no difficulty in creating incisions of suitable depth and number as a step preliminary to the necessary treatment.

Additionally, the present apparatus is of a type such that it may be manipulated using only one hand. Therefore, a person who has been bitten on the forearm or hand will have practically no difficulty in properly lancing the punctured area in accordance with approved techniques.

Among other objects of the invention are those of furnishing a structure which will be extremely compact and include relatively few parts, each individually simple and rugged in construction. Those parts will be capable of ready assemblage to furnish an apparatus which may lie dormant for indefinite periods of time, but at the same instant when it is desired to use it, will be immediately available and operative.

With these and other objects in mind, reference is had to the attached sheet of drawing, illustrating one practical embodiment of the invention, and in which:

Fig. 1 is a side elevation of the apparatus;

Fig. 2 is a rear view of the same;

Fig. 3 is a sectional side view, taken along the line 3—3 in the direction of the arrows as indicated in Fig. 2;

Fig. 4 is a front view of the assembly;

Fig. 5 is a view similar to Fig. 2 but showing the parts in a different position;

Fig. 6 is a transverse sectional view taken along the line 6—6 in the direction of the arrows as indicated in Fig. 3; and Fig. 7 is a perspective view of the operating shaft assembly.

In these views the reference numeral 10 indicates the side wall of a housing provided with a base 11 and a cover 12. The base is extended as at 13 and preferably terminates in a serrated edge 14. A rotatable shaft 15 extends through both the base 11 and cover 12. This shaft carries a projection 16 which rides within a groove 17 formed in the outer face of the base and is engageable with a stop or abutment portion 18, extending into that groove and preferably integral with the base.

An outer plate 19 forms a part of the shaft and may be integral therewith. This plate is conveniently circular and carries a crank pin 20. The latter has bearing within an opening formed through the body of a lancet blade 21. That blade is guided in its movements toward and away from edge 14 by having the edges of a slot 22 formed in its body engage with the stem of a headed pin 23. The latter extends from the rear face of the projecting wall portion 13. That portion serves as a guard extending adjacent and beyond the cutting edge at point 24 of the blade, when the latter is in its normal and retracted positions.

To rotate shaft 15, any suitable motive force may be employed. This preferably takes the form of a coil spring 25, disposed within the housing 10. One end of this spring is anchored to shaft 15 by preferably passing through the same as indicated at 26. The opposite end of the spring may—as at 27—pass through an opening in housing 10. At a point beyond cover 12, shaft 15 is headed by conveniently mounting a bolt 28.

A releasable clutch or detent structure is provided by forming the end portion 29 of shaft 15 to embody a non-circular configuration. A handle 30 is formed with an opening 31 of keyhole configuration and the enlarged portion of which has a diameter at least equal to that of the shaft 15. Its reduced portion accommodates the non-circular end 29 of the shaft. The other end of the handle conveniently includes a handle portion 32. By means of the latter and with the clutch engaged as in Fig. 5, shaft 15 may be turned. The body of the handle 30 includes a certain amount of resiliency. Otherwise, its coupling with the shaft may embody sufficient looseness so that the handle may not alone ride adjacent the rear edge of housing 10, but also may override the cam surface 33 of a retaining abutment 34 terminating in a hook-shaped rest portion. Thus, it is apparent that the handle may be moved through a circle. After the clutch parts have been engaged, it will carry with it the shaft 15. Thereupon, the parts may be brought to the position shown in Fig. 5, at which the handle will be retained within the recess defined by the forward face of abutment 34 and will hold the shaft against rotation.

Now, in using the device, it will primarily be assumed that handle 30 occupies the position shown in Fig. 2. In that position, the enlarged part of the keyhole opening 31 is in line with shaft 15. By rotating the handle in a clockwise direction, the reduced portion of the opening may be brought into registry with the non-circular part 29 of the shaft. Thereupon, by moving the handle outwardly in a radial direction, the clutch parts are engaged. Therefore, continued movement in a clockwise path will cause shaft 15 to be rotated as the handle is swung. This action will continue, as before brought out, until the handle is latched behind the retaining parts provided by abutment 34. With such rotation of shaft 15, the end 26 of spring 25 will be similarly moved to thus tension that spring. Therefore, a maximum driving force will exist, but the shaft will be prevented from rotating due to the detent action of the clutch.

Assuming that a person has been bitten by a snake, it is immediately necessary that within the area of the puncture the flesh be slashed, preferably in a cross pattern. This will induce a discharge of the venom as the blood flows from the cuts. A user will place the apparatus with the edge portion 14 adjacent the punctured area. Due to the serrations, there will be little likelihood of the apparatus slipping, in that they will anchor it to the skin surface. Now, by simply pressing handle 30 inwardly toward the axis of shaft 15, the clutch will be released. This will occur as the enlarged portion of opening 31 aligns with the shaft body; that handle moving from the position shown in Fig. 5 to the one illustrated in Fig. 2.

Immediately upon the shaft being released, crank pin 20 will rapidly move through an arc. Consequently, blade 21 will be oscillated, projected and retracted around the shank of pin 23. Therefore, the point and cutting edge portions of the blade adjacent thereto will have a path of movement of the order indicated in dash lines in Fig. 4. This will, of course, cause the point of the blade to be plunged into the flesh, then moved laterally and thereupon retracted. Accordingly, a slash or incision will result in the flesh. Continued movement of the blade will not occur, due to the stop structure furnished by parts 16 and 18. A second slash may be achieved by repeating the foregoing operations.

As will be apparent, the present apparatus may be repeatedly used. When the blade requires removal, this may be easily accomplished. All that is required is for the operator to spring the inner end of blade 21 away from the pin 20. As the blade clears this part, it may be swung so that its slot 22 aligns with the head of pin 23. Thereupon, it may be lifted clear of the assembly.

Thus, among others, the several objects of the invention as specifically aforenoted are achieved. Obviously, numerous changes in construction and rearrangements of the parts might be resorted to without departing from the spirit of the invention as defined in the claims.

I claim:

1. A mechanism for operating a lancet, said mechanism including, in combination, a mounting, power means supported by said mounting, means for operatively coupling a blade with said power means, and said mounting presenting a serrated edge portion to engage the surface of the epidermis to retain said mounting against shifting with respect to such surface.

2. A lancet assembly comprising in combination a mounting, a shaft rotatably supported by said mounting, a crank connected to said shaft, a blade having a sharpened end, said blade being operatively connected adjacent its opposite end with said crank and disposed for slidable movement with respect to said mounting, a spring connected to said shaft to rotate the same, a single manually operated lancet-actuating means, shiftable clutch means connecting said latter means with said shaft to rotate the latter and tension said spring and said clutch means being shiftable to release said shaft from said manually operated means whereby said spring will rotate said shaft to project the sharpened end of said knife beyond said mounting.

3. In an assembly as specified in claim 2, stop means extending from said mounting and cooperating with said shaft and said stop means limiting the rotation of the latter with respect to said mounting.

4. In a lancet assembly as specified in claim 2, said slidable disposition of said blade with respect to said mounting comprising a headed pin and cooperating slot connection forming parts of said housing and blade and the relative areas of such head and slot being such that by moving said blade with respect to said pin, the former may be detached from said mounting.

5. In a lancet assembly as specified in claim 2, said lancet actuating means comprising a lever swingable around the shaft axis and formed with a key-hole type slot and a non-circular zone formed in said shaft and engageable with the non-annular portion of said shaft to prevent rotation of said lever with respect to said shaft and said lever being shiftable to align the circular portion of said slot with said shaft and free the latter from restraint by said lever.

6. In a lancet assembly as specified in claim 5, and detent means associated with said mounting and engageable with said lever to retain the latter against swinging movement.

References Cited in the file of this patent

UNITED STATES PATENTS

| 6,240 | Ives | May 27, 1849 |
| 931,791 | Niergarth | Aug. 24, 1909 |
| 2,711,738 | Kelly et al. | June 28, 1955 |